United States Patent

[11] 3,582,723

[72] Inventor George Emmasingel Kerr
Eindhoven, Netherlands

[21] Appl. No. 759,166
[22] Filed Nov. 11, 1968
[45] Patented June 1, 1971
[73] Assignee U. s. philips Corporation
New York, N.Y.
[32] Priority Sept. 15, 1967
[33] Netherlands
[31] 6,712,617

[54] TRANSISTOR
3 Claims, 6 Drawing Figs.

[52] U.S. Cl. ........ 317/235, 317/234
[51] Int. Cl. ........ H01l 19/00
[50] Field of Search ........ 317/235, 40.13, 235/22

[56] References Cited
UNITED STATES PATENTS
3,444,443 5/1969 Moroshima ........ 317/235

*Primary Examiner*—John W. Huckert
*Assistant Examiner*—Martin H. Edlow
*Attorney*—Frank R. Trifari

ABSTRACT: A high-power transistor in which the emitter is in the form of a grid adjoining a surface of a semiconductor body having collector and base regions, the latter surrounding the emitter. The apertures in the emitter grid form a plurality of juxtaposed rows with the base region.

Figure 1:
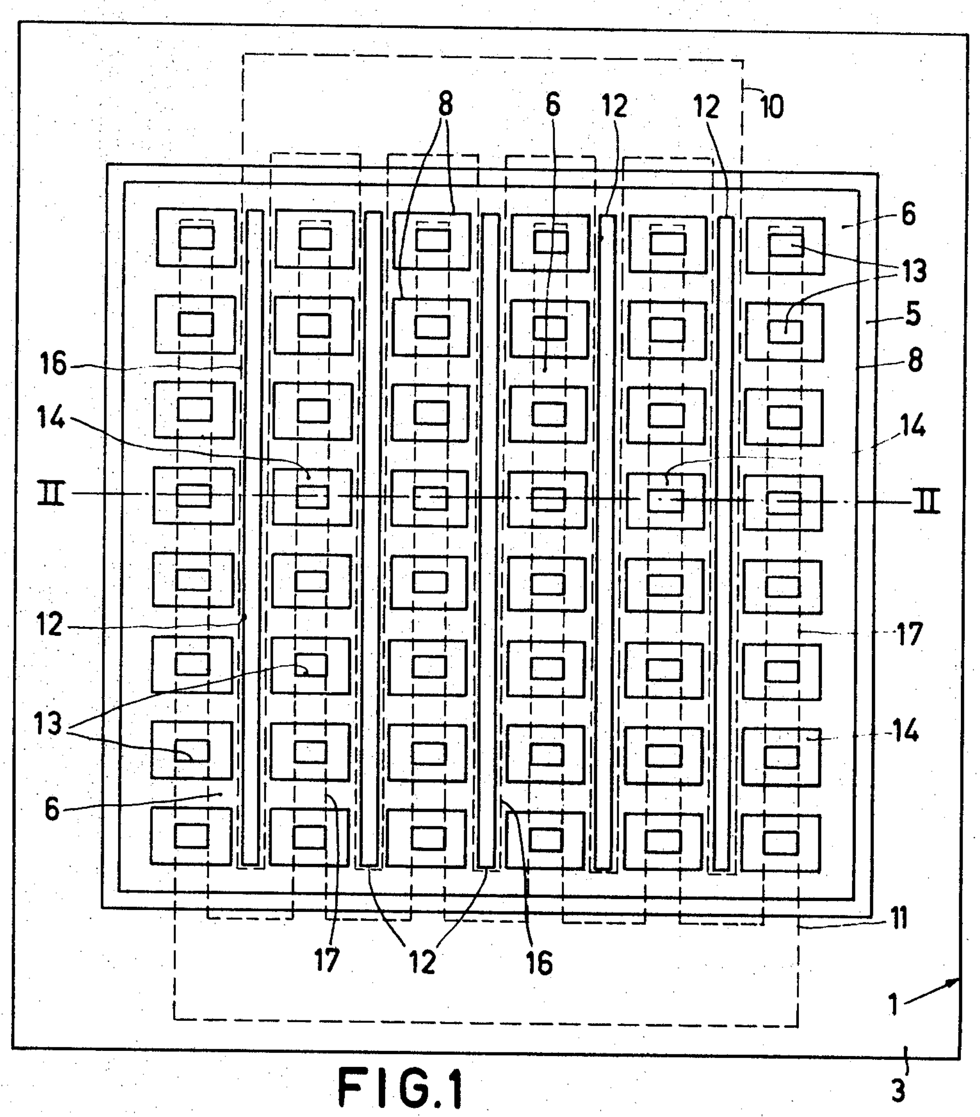

The surface of the semiconductor body is covered with an insulating layer which covers the line of intersection of the emitter base junction with the surface. Base and emitter contacts are provided on the insulating layer forming an interdigital system.

Viewed along a row, the apertures in the emitter grid first have an increasing width and then a decreasing width. The apertures in a direction at right angles to the row correspond to digits of the base contact are arranged in rows.

The insulating layer also comprised windows located substantially between four adjacent apertures through which the emitter contacts are connected to the emitter region.

INVENTOR.

GEORGE KERR

BY

[signature]

AGENT

INVENTOR.
GEORGE KERR
BY
[signature]
AGENT

TRANSISTOR

The invention relates to a transistor comprising a semiconductor which having a collector region, a base region adjoining a substantially flat surface of the semiconductor body, and an emitter region adjoining only the said surface and further surrounded entirely by the base region, the emitter region having the form of a grid or an apertured layer, the apertures forming a number of juxtaposed rows, the base region in the apertures adjoining the said surface, an insulating layer being provided on the said surface and covering at least the line of intersection of the emitter-base junction with the said surface, the base contact being a base contact layer located on the insulating layer and having a number of digits each of which is located across at least one row of apertures and is connected to the base region at least at the area of the apertures, the emitter contact being an emitter contact layer provided on the insulating layer and having a number of digits which are connected to the emitter region, the base and emitter contact layers constituting an interdigital system.

In order to make transistors suitable for high power, a large edge length of the emitter region is desirable since during normal operation mainly the edge portions of the emitter region contribute actively to the operation of the transistor. Furthermore, a distribution of the current over the edge of the emitter region which is as homogeneous as possible is desirable so as to restrict the possibility of the occurrence of local high current densities which may cause second breakdown.

In order to obtain a large emitter edge length, the emitter region of a known type of transistors is subdivided into a large number of small emitter regions, located at a number of juxtaposed rows. The small emitter regions are interconnected electrically by the emitter contact in which in practice the emitter regions per row are interconnected electrically by a contact while furthermore said contacts are interconnected electrically. With these modern structures it is in practice only possible to connect the base contact between the rows of emitter regions to the base region but not between the emitter regions of one and the same row. As a result of this the current distribution over the edge of the emitter regions would be very unfavorable. Therefore the base region has been provided with a network of highly doped regions in which the emitter regions are located in the meshes of the network, and in which the base contact is connected to the network between the rows of emitter regions. As result of this the current distribution along the edges of emitter regions has been improved but said current distribution still leaves much to be desired. Moreover, the network consumes quite some space so that the distance between the emitter regions must be rather large and the total emitter edge length per surface unit of the transistor is restricted. Furthermore, an extra diffusion treatment is necessary for providing the network.

In a transistor of the type mentioned in the preamble the disadvantages of said known types of transistors are avoided at least considerably.

With an emitter region in the form of a single structure a larger emitter edge length per surface unit of the transistor and a more homogeneous distribution of the base current over the emitter edge can be obtained while avoiding a region associated with the base region in the form of a low-ohmic network.

It is to be noted that the expression "emitter edge length per surface unit of the transistor" is to be understood to mean the length of the line of intersection of the emitter base junction with the said substantially flat surface of the transistor per surface unit of that part of the substantially flat surface bounded by the base and emitter regions.

Moreover the possibility of second breakdown is smaller than in an emitter region which is subdivided into a number of separate small regions, since in the case of a large emitter region any current concentration occurring can expand first over a large part of the emitter region before the current density locally becomes so high that second breakdown occurs.

Further a good current distribution in the emitter region of a transistor may be obtained since the emitter region is much more low-ohmic than the base region so that the emitter region itself forms as it were a low-ohmic network.

It is an object of the invention to provide a structure for a transistor of the type described in the preamble in which a very large emitter edge length per surface unit of the transistor is possible.

According to the invention a transistor of the type described in the preamble is characterized in that, viewed in a direction along a row, the apertures first have an increasing width and then a decreasing width, the apertures in a direction at right angles to said rows corresponding to digits of the base contact layer, being likewise arranged in rows, the insulating layer comprising windows which are located substantially centrally between four adjacent apertures, and through which windows the emitter contact layer is connected to the emitter region.

In this structure, the apertures can be located very closely together while between four adjacent apertures there nevertheless is space for windows to contact the emitter region.

The apertures may have a circular shape. Preferably the apertures are substantially square in which oppositely located corners of an aperture lie substantially on the center line of a row. A very large emitter edge length per surface unit of the transistor have been obtained with these square apertures and a better current distribution in the emitter zone than in the case of circular apertures. With circular apertures the path in the emitter zone between two juxtaposed apertures is over a greater distance very narrow.

Inter alia with a view to a low collector series resistance combined with a large base-collector breakdown voltage, the transistor preferably is an epitaxial transistor, in which the semiconductor body consists of a semiconductor substrate and an epitaxial semiconductor layer provided thereon, the base region and the emitter region being provided in the epitaxial layer, a part of the collector region adjoining the base region being associated with the epitaxial layer and having a higher resistivity than the remainder of the collector region.

Figure 2:
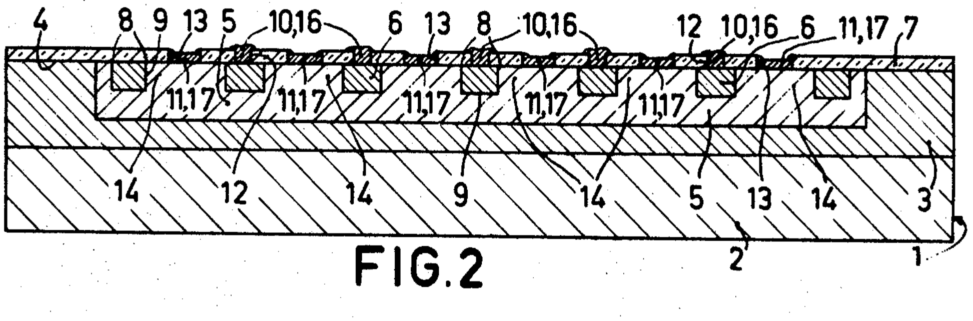
Figure 3:
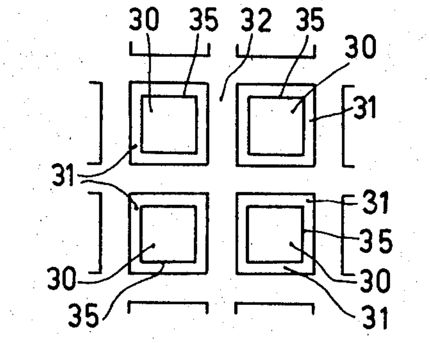
Figure 4:
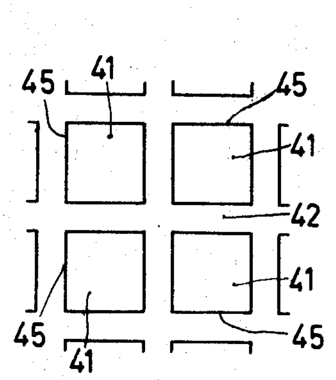

In order that the invention may be readily carried into effect, a few examples thereof will now be described in greater detail with reference to the accompanying drawings, in which FIG. 1 is a diagrammatic plan view of a transistor of which FIG. 2 is a diagrammatic cross-sectional view taken on the line II—II in FIG. 1, FIGS. 3 and 4 diagrammatically show parts of plan views of two transistors.

Figure 5:
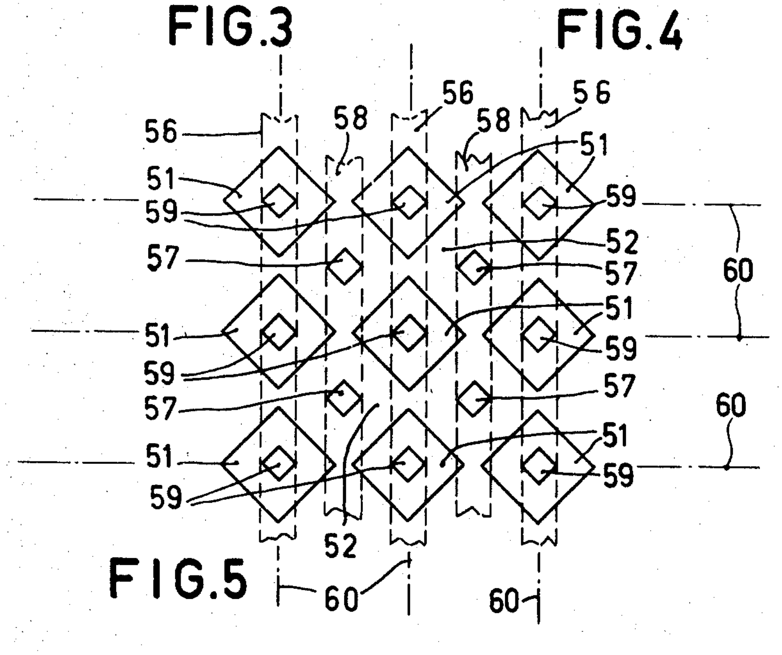

FIG. 5 shows diagrammatically a part of a plan view of an embodiment of a transistor according to the invention.

Figure 6:
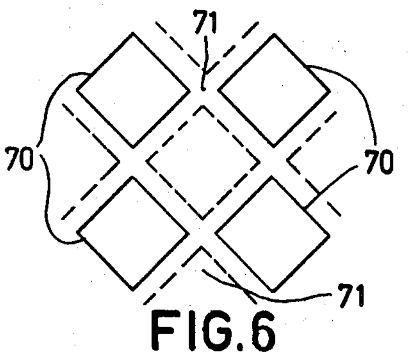

FIG. 6 diagrammatically shows a part of a diffusion masking layer which may be used in manufacturing a transistor according to the invention.

FIGS. 1 and 2 show a transistor comprising a semiconductor body 1 having a collector region 2, 3, a base region 5 adjoining substantially flat surface 4 of the semiconductor body 1, and an emitter region 6 adjoining only the said surface 4 and further fully surrounded by the base region 5. On the surface 4 is provided an insulating layer 7 which covers at least the line of intersection 8 of the emitter-base junction 9 with said surface 4. An emitter contact 10 and a base contact 11 are connected, through windows 12 and 13 in the insulating layer 7, to the emitter region 6 and the base region 5.

It is to be noted that in the plan view shown in FIG. 1 the insulating layer 7 is assumed to be transparent so that the underlying regions are visible.

The emitter region 6 has the form of a grid, i.e., a layer provided with apertures 14, the base region parts 5 in the apertures 14 adjoining the surface 4 and being connected to the contact layer 11 at the area of the apertures 14.

The emitter region has a number of juxtaposed rows of rectangular apertures 14, as is shown in FIG. 1. The base contact 11 is a base contact layer located on the insulating layer 7 and having a number of digits 17 which are each located across a row of apertures 14 and which are connected to the base region 5 through the windows 13 at the area of the apertures 14. The emitter contact 10 is also an emitter contact layer located on the insulating layer 7 and having a number of digits 16, which, through the elongate windows 12, are connected to the emitter region 6. The contact layers 10 and 11 constitute an interdigital system.

The transistor shown in FIGS. 1 and 2 is a so-called planar epitaxial transistor. The semiconductor body 1 consists of a semiconductor substrate 2 and an epitaxial semiconductor layer 3 provided thereon. The base region 5 and the emitter region 6 are provided in the epitaxial layer 3, while a part of the collect region 2, 3 adjoining the base region 5 is associated with the epitaxial layer 3 and has a higher resistivity than the remainder 2 of the collector region.

The transistor shown in FIGS. 1 and 2 may be manufactured as follows:

Starting material is an N-type silicon body 1 consisting of a substrate 2, thickness approximately 200microns, resistivity from 0.01 to 0.001 ohm cm. on which an N-type epitaxial layer 3, thickness approximately 15microns, resistivity approximately 2 ohm. cm, is provided.

The further proportions of the silicon body are usually chosen to be sufficiently large so as to be able to manufacture a large number of transistors simultaneously, the individual transistors being obtained by subdivision of the semiconductor body. In the present example, however, the manufacture of one transistor will be described for reasons of simplicity.

A diffusion mask, for example, of silicon oxide, is provided on the epitaxial layer in a manner commonly used in semiconductor technology, while by diffusion of an impurity, for example, boron, in the N-type body 1 which constitutes the collector region 2, 3 a P-type surface region, the base region 5, is provided.

The base region 5 has proportions of approximately 210×1902.5 microns and adjoins the substantially flat surface 4 of the epitaxial layer 3.

A diffusion masking layer, for example, of silicon oxide, is then provided on the substantially flat surface 4, parts of said layer being removed by means of conventional photomasking and etching methods so as to obtain free surface portions of the base region 5 which correspond to a surface region of the N-type to be provided, namely the emitter region 6, in the form of a grid or a layer provided with apertures. So one aperture is provided in the diffusion masking layer in the form of a network, after which by diffusion of an impurity, for example, phosphorus, the emitter region 6 in the form of a network is provided comprising the apertures 14. The emitter region has approximately dimensions of 190×170×1.5$\mu$ and comprises 48apertures of dimensions of approximately 20×12$\mu$. The distance between the apertures is approximately 0$\mu$.

The whole surface 4 is then covered with an insulating layer 7, for example, of silicon oxide, in which in a conventional manner the windows 12, dimensions approximately 6×160$\mu$, and the windows 13, dimensions approximately 8×4$\mu$, are provided.

The base contact layer 11 provided with the digits 17 is provided in a conventional manner on the insulating layer 7, the digits being connected to the base region 5 through the windows 13 at the area of the apertures 14.

Furthermore, the emitter contact layer 10 provided with digits 16 is provided, the digits 16 being connected to the emitter region 6 through the windows 12.

The contact layers may consist, for example, of aluminum layers.

Connection conductors may be connected to the contact layers 10 and 11 in any conventional manner.

A collector contact may be connected to the substrate 2 in a commonly used manner, after which the transistor may be provided in an envelope.

With a view to a ready heat dissipation and a small collector series resistance, it is recommendable to make the substrate 2 thinner, for example, by etching the substrate on the lower side until the thickness of the substrate will be reduced, for example, to approximately 80$\mu$.

FIG. 3 shows part of a plan view of a known type of overlay transistor having a subdivided emitter region. Shown are the 4 emitter partial regions 30 surrounded by the base region 31, in which a low-ohmic network 32 associated with the base region is provided so as to enable a good base current distribution. The base contact, not shown to avoid complexity of the drawing, is connected to the network 32 and the emitter contact (not shown) is connected to the partial regions 30.

FIG. 4 shows a part of a plan view of a transistor in which the network 42, which in the plan view of FIG. 3 and 4 has the same proportions as the network 32, is the emitter region and to which the emitter contact is connected. The meshes 41 of the network 42 (the apertures 41 in the emitter region 42) are associated with the base region and the base contact is connected to the base region at the area of the said meshes 41.

It can be seen from FIGS. 3 and 4 that the length of the emitter edge 45 per surface unit in FIG. 4 is larger than the length of the emitter edge 35 in FIG. 3.

The meshes 41 can be made smaller and, for example, have the same dimensions as the regions 30, in which a larger number of meshes per surface unit is possible.

Since the base region is contacted at the area of the meshes 41, the base contact regions are completely surrounded by the emitter edge 45 so that a homogeneous base current distribution occurs.

FIG. 5 shows a part of a plan view of an embodiment of a transistor according to the invention. The apertures 51 of the emitter region 52 in a direction along a row of apertures corresponding to digits 56 of the base contact layer, first show an increasing and then a decreasing width. In a direction at right angles to the rows corresponding to the base digits 56, the apertures 51 are also arranged in rows. The insulating layer comprises windows 57 which are located substantially centrally between four adjacent apertures 51, the digits 58 of the emitter contact layer being connected to the emitter region 52 through the said windows 57.

The digits 56 of the base contact layer are connected to the base region through windows 59 provided in the insulating layer at the area of the apertures 51 of the emitter region 52.

In FIG. 5, the insulating layer is again assumed to be transparent so that the underlying regions are visible while furthermore the conductors provided on the insulating layer are shown in broken lines for clearness' sake.

The apertures 51 are substantially square, oppositely located corners of an aperture 51, being located substantially on the center line 60 of a row.

A configuration as shown in FIG. 5 enables a large density of apertures 51 and hence a large emitter edge length per surface unit, since the apertures 51 in a row can be located very closely together while between four adjacent apertures, there is nevertheless space available to contact the emitter region 52 through a window 57.

The apertures 51 may alternatively have, for example, a circular shape, in which however, a less favourable current distribution occurs in the emitter region when the apertures in a row are located closely together.

A transistor having a configuration as shown in FIG. 5 can be manufactured in a manner which is quite analogous to that described above. If it is desired to provide the apertures 51 at a very small distance from each other, a diffusion masking layer may be used in providing the emitter region 52 of which, it is true, parts corresponding to the emitter region 52 to be provided are removed, but these removed portions need not only form one cohering aperture in the masking layer, but, as shown in FIG. 6 may form a large number of separate apertures 70. Since the diffusion also takes place in the lateral direction below the masking layer 71, a single coherent emitter region is nevertheless obtained which is shown in FIG. 6 by broken lines and which has the same shape as the emitter region 52 in FIG. 5. It is alternatively possible to provide apertures 70 (FIG. 6) in the insulating layer 71, which just touch each other.

It will be obvious that the invention is not restricted to the examples described and that many variations are possible to those skilled in the art without departing from the scope of this invention. For example, the semiconductor body of a transistor according to the invention may consist of a semiconductor material other than silicon, for example, germanium or an $A_{III}B_{V}$ compound. The insulating layer may consist, for example, of silicon nitride instead of silicon oxide. The number of apertures in the emitter region may be larger or smaller than the above-mentioned number and the apertures may have a different shape. A transistor according to the invention will generally have an emitter region with at least 10 apertures, since in fact the invention relates to transistors in which inter alia a large emitter edge length is desirable. Suitable embodiments will generally even have at least 20 apertures in the emitter region. The semiconductor body need not consist of a substrate provided with an epitaxial layer, but may, for example, also consist of a semiconductor body the conductivity of which is increased by diffusion of an impurity with the exception of a surface layer.

Besides through windows in the insulating layer which are located between four adjacent apertures in the emitter region, the emitter contact in the example shown in FIG. 4 may moreover be connected to the edge portions of the emitter regions through windows which are not located between four adjacent apertures. Furthermore, in the examples described the base contact may be connected, besides at the area of the apertures, to edge portions of the base region which are entirely located outside the emitter region. In addition to the emitter base- and collector regions, the semiconductor body may comprise further regions and, for example form part of an integrated circuit.

I claim:

1. A transistor comprising a semiconductor body having a planar surface, a collector region of one-type conductivity in the body, a base region of the opposite-type conductivity within the collector region and adjacent the planar surface, an emitter region of the one-type conductivity within the base region and adjacent the planar surface and being surrounded entirely by the base region, said emitter region having the form of a regular grid containing apertures through which base region portions extend to the planar surface, the emitter grid apertures being arranged in transverse rows and columns, an insulating layer on the planar surface covering at least the regions thereof where the junctions between the emitter and base regions extend to the planar surface, said insulating layer having plural base contact windows over the base region portions in the grid apertures, said insulating layer having plural emitter contact windows over the emitter grid, a base contact on the insulating layer and forming a number of digits each extending along a column of grid apertures into contact with the base regions through the base contact windows, and an emitter contact on the insulating layer and forming a number of digits each extending parallel to and between the grid aperture columns into contact with emitter grid regions through the emitter contact windows, sand base and emitter contacts forming an interdigital system, the emitter grid apertures having a configuration at which, view in directions along their rows, they first gradually increase and then immediately gradually decrease in width, each emitter contact window being located substantially centrally between four adjacent grid apertures.

2. A transistor as set forth in claim 1 wherein the emitter grid apertures are substantially square but rotated approximately 45° to the columns of base contact digits such that opposite corners of each aperture are aligned with the base contact digits.

3. A transistor as set forth in claim 2 wherein the collector region portion adjacent the base region has a higher resistivity than more remote collector region portions, and the emitter region is more highly doped than the base region.

UNITED STATES PATENT OFFICE
CERTIFICATE OF CORRECTION

Patent No. 3582723 Dated June 1, 1971

Inventor(s) GEORGE KERR

It is certified that error appears in the above-identified patent and that said Letters Patent are hereby corrected as shown below:

In the Abstract, line 15, "comprised" should read -- comprises --.

Column 1, line 3, "which" should read -- body --;

line 54, before "said" insert -- the --;

line 72, "large" should read -- larger--.

Column 2, line 54, after "adjoining" insert -- a --.

Column 3, line 11, "collect" should read -- collector --;

line 35, "210 x 1902.5" should read -- 210 x 190 x 2.5 --;

line 51, "0μ" should read -- 10μ --.

Column 4, line 20, "regions" should read -- region --.

Signed and sealed this 9th day of November, 1971.

(SEAL)
Attest:

EDWARD M.FLETCHER,JR.
Attesting Officer

ROBERT GOTTSCHALK
Acting Commissioner of Patents

FORM PO-1050 (10-69)

USCOMM-DC 60376-P69
☆ U.S. GOVERNMENT PRINTING OFFICE : 1969 O—366-334